Nov. 12, 1963 C. P. BEAN 3,110,613
MAGNETIC MATERIAL
Filed Sept. 19, 1960
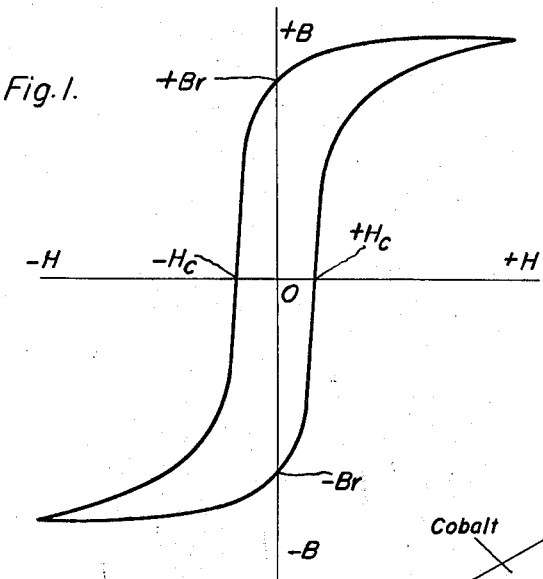
Fig. 1.
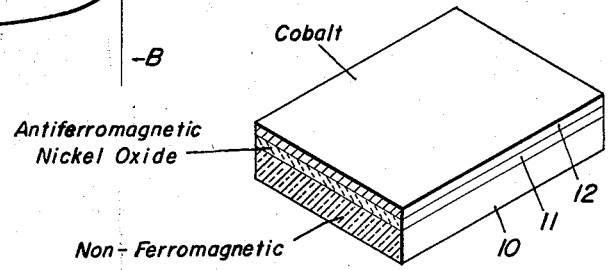
Fig. 2.
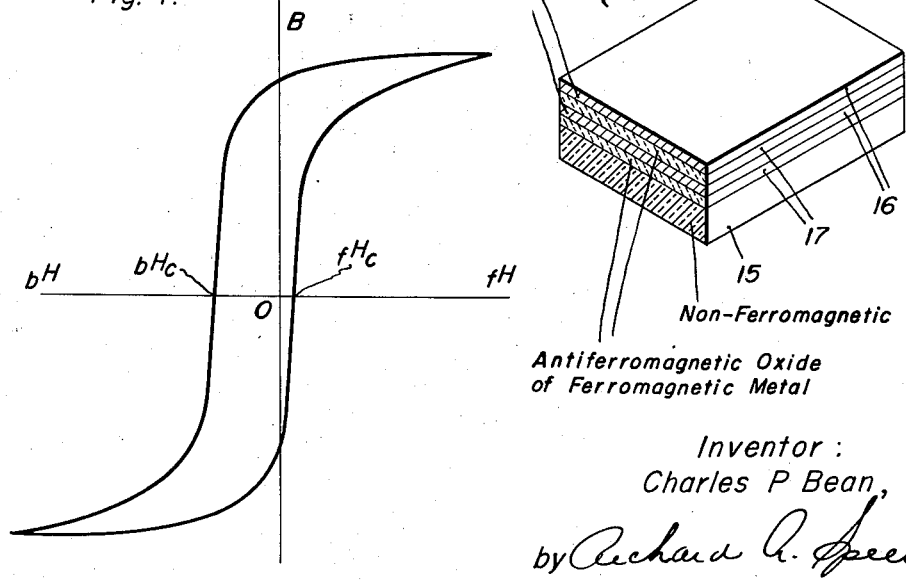
Fig. 3.
Fig. 4.
Inventor:
Charles P Bean,
by *[signature]*
His Attorney.

United States Patent Office 3,110,613
Patented Nov. 12, 1963

3,110,613
MAGNETIC MATERIAL
Charles P. Bean, 2221 Stoneridge Road,
Schenectady, N.Y.
Filed Sept. 19, 1960, Ser. No. 56,933
5 Claims. (Cl. 117—71)

This invention relates to a magnetic material and more particularly to a composite body comprising a ferromagnetic portion magnetically coupled to an antiferromagnetic portion, the body possessing a single preferential direction of magnetic polarization and a substantially constant or non-diminishing value of rotational hysteresis losses under high magnetic fields, and to a method for preparing such materials.

This application is a continuation-in-part of applicant's copending application, Serial No. 699,833, filed November 29, 1957, which has been forfeited.

Previously known magnetic materials have been most readily magnetized along one particular crystallographic axis and have been equally readily magnetizable in either direction along that axis. The magnetic properties of these previously known materials have been measured and evaluated by several methods, perhaps the best known being the graphical representation of the hysteresis loop obtained when a magnetic field is applied to the magnetic material in such a manner as to cyclically reverse its polarity. The magnetic properties of these previously known materials have been symmetrically reversible, both quantitatively and qualitatively, with respect to a given axis of magnetization. Furthermore, these previously known materials have had at least two stable positions in a strong magnetic field.

A magnetic material having only one direction of easiest magnetization and only one stable position in magnetic fields of any strength would be desirable and useful in many applications. Furthermore, it would be desirable to fabricate composite bodies of material having such magnetic properties in the form of lamellar bodies having a large surface-to-volume ratio for many electrical and electromagnetic applications.

Additionally, previously known magnetic materials have exhibited a characteristic behavior when rotated in a unidirectional magnetic field which has generally been referred to as rotational hysteresis. This may be described in the following manner. Assume a body of conventional magnetic material is supported in a unidirectional magnetic field and adapted to be rotated about an axis passing through the body normal to the direction of the field. As the body is rotated about this axis, the direction of magnetic polarization of the body will attempt to remain parallel to the direction of the applied field. If the strength of the applied magnetic field is low, the direction of the polarization of the material shifts very little and with no discontinuous motion which gives rise to loss. As the strength of the applied magnetic field is increased, the direction of polarization of the material changes its direction discontinuously during the course of its rotation, producing loss and a peak value of rotational hysteresis. Then as the field is further increased, the polarization of the material follows the field closely with no discontinuous motion and therefore no loss and consequently the value of rotational hysteresis approaches zero.

As is well known in certain electrical apparatus which involve the rotation of magnetic materials in applied magnetic fields for their operation, such as, for example, so-called "hysteresis motors," the attainment of high hysteresis losses is limited to the relatively narrow value of the applied field which corresponds to the peak on the rotational hysteresis curve for the particular magnetic material involved. A magnetic material having relatively high, non-diminishing rotational hysteresis loss for higher-employed magnetic fields would be desirable for such apparatus. It would be desirable to fabricate such a material in the form of lamellar bodies having a large surface-to-volume ratio for many applications in such apparatus.

It is therefore a principal object of my invention to provide a magnetic material having a single preferential direction of magnetic polarization and a substantially constant or non-diminishing value of rotational hysteresis losses under high magnetic fields in the form of lamellar bodies having a large surface-to-volume ratio.

A further object of my invention is the provision of a magnetic material having only one direction of easiest magnetization and only one stable position in magnetic fields of any strength. It is a further object of my invention to provide a method for making such a magnetic material. Other and specifically different objects of my invention will become apparent to those skilled in the art from the following detailed description of my invention, particularly when read with reference to the accompanying drawing in which:

FIG. 1 is a graphical representation of the direct current hysteresis loop of a conventional ferromagnetic material;

FIG. 2 is a perspective view of an embodiment of my invention with parts broken away for clarity;

FIG. 3 is similar to FIG. 2 and shows a further embodiment; and

FIG. 4 is a graphical representation of an asymmetrical direct current hysteresis loop characteristic of the material of my invention.

Briefly stated, in accordance with one aspect of my invention, I provide magnetic materials in the form of lamellar bodies having a very large surface-to-volume ratio, said bodies consisting essentially of a ferromagnetic metal portion and an antiferromagnetic oxide portion in contiguous and intimate magnetic relationship with a surface of said metallic portion. Furthermore, the antiferromagnetic oxide portion of these bodies may consist of an oxide of the same ferromagnetic metal to which it is magnetically coupled or it may be an antiferromagnetic oxide of a different metal.

As previously pointed out, conventional magnetic materials have characteristically exhibited a symmetrical response to cyclically-applied magnetic fields. This may be illustrated, for example, by the typical direct current hysteresis loop of such a material schematically shown in FIG. 1. In this figure the magnetizing field H in oersteds is the axis of abscissas and the magnetic flux density or induction B in gauss is the axis of ordinates. As the field is increased from zero to higher values of H in what for convenience may be referred to as the positive direction, the magnetic flux density of the material attains a maximum value of B for a given field. If the field $+H$ is removed, the value of B decreases to $+B_r$. If a field having a reverse direction, $-H$, is then applied, the magnetic flux density of the material decreases and crosses the H axis at the value $-H_c$ which is usually expressed as $H_c$ and the magnetic flux density increases to a maximum value of B as the field is increased in the negative direction. This maximum value of B is dimensionally equal to the maximum value of B previously referred to for a $-H$ field of the same strength as the previously applied $+H$ field. If the $-H$ field is reduced to zero, the magnetic flux density of the material correspondingly drops to a value of $-B_r$ which is numerically equal to the $+B_r$ previously obtained, and if the $+H$ field is reapplied, the magnetic flux density approaches and crosses the H axis at the value of $+H_c$ which is numerically equal to the $-H_c$ previously obtained. As the $+H$ field is increased, the magnetic flux density of the material again approaches and becomes equal to the previous maximum value of B for the same field strength as before.

The descending branch of the hysteresis loop between $+B_r$ and $-H_c$ is known as the "demagnetization curve" and serves as a measure of the total magnetic energy of a given magnetic material. This is usually expressed as the maximum value of the product of B and H of this portion of the curve, $(BH)_{max}$, as shown in FIG. 1 and is proportional to the maximum amount of magnetic energy that a magnet of a given material can support in an air gap per unit volume of material in the magnet. Therefore, the $(BH)_{max}$ value of a material is customarily used as a direct indication of the strength of magnets of a given size and configuration which may be made therefrom.

From the foregoing, it is readily seen that the magnetic properties of these previously known magnetic materials are symmetrically reversible both quantitatively and qualitatively with respect to a given axis of magnetization. Furthermore, these previously known materials have had at least two stable positions in a strong magnetic field.

The magnetic material of my invention is characterized by an asymmetrical hysteresis loop, has only one stable position in a unidirectional magnetic field, and therefore has two different values for coercive force ($H_c$) and remanence ($B_r$), depending upon a direction of the imposed magnetic field. This behavior is the result of a magnetic coupling or interaction between a ferromagnetic portion and an antiferromagnetic portion comprising the composite body of my invention. Furthermore, because of the lamellar configuration of these ports, it is possible to produce composite bodies having a very high ratio of the area comprising the magnetically-coupled interface between the antiferromagnetic portion and the ferromagnetic portion to the volume of either or both of these portions. Yet, further, such a configuration makes it possible to construct magnetic bodies of a great variety of shapes from either single lamellar composite bodies or from a plurality of such bodies laminated or stacked together. It will be appreciated that the word "lamellar" is not intended to be restricted to planar bodies.

In order to more particularly disclose one embodiment of my invention, the following detailed example is given.

A coating of nickel about 500 Angstrom units in thickness was applied by evaporation to one surface of a conventional microscope slide cover glass measuring about 1" by 1" by 8 mils in thickness in the following manner. The glass body was supported in an enclosure adapted to be evacuated about 2.5 inches from a basket of tungsten wire with the surface of the body to be coated presented to the basket. A body of substantially pure nickel was placed in the basket, the atmosphere evacuated from the enclosure surrounding the glass body and the basket to a pressure of about $10^{-6}$ mm. of mercury and the basket and the nickel body heated to about 1500° F. for about 1 minute. The body was removed from the enclosure after permitting the tungsten basket and the remaining nickel contained therein to cool.

The metallic nickel coating was then completely oxidized to form an adherent coating of antiferromagnetic NiO by heating the coated glass body to about 230° C. for 30 minutes in an air atmosphere after which it was permitted to cool.

A coating of cobalt about 500–1000 Angstrom units in thickness was then applied by evaporation to cover the nickel oxide coated surface of the glass body in the following manner. The glass body was again supported in an enclosure adapted to be evacuated about 2½ inches from a basket of tungsten wire with the nickel oxide coated surface presented to the basket. A body of substantially pure cobalt was placed in the basket, the atmosphere evacuated from the enclosure surrounding the glass body and the basket and the cobalt body then heated to about 1650° C. for about 1 minute. The coated glass body was then removed from the enclosure after permitting the tungsten basket and the remaining cobalt contained therein to cool.

The resulting coated glass body is schematically illustrated in FIG. 2, wherein the relative thickness of the layers of the coated materials have been exaggerated with respect to the dimensions of the glass body and part of the composite body has been shown as broken away for clarity. The glass body is shown at 10, the adherent nickel oxide coating at 11 and the metallic cobalt coating which overlies and is adherent to the nickel oxide coating at 12.

This composite body was then heated in a protective atmosphere of nitrogen to a temperature of about 280° C. and permittted to cool to room temperature while a unidirectional magnetic field of about 100 oersteds was applied thereto.

The direct current coercive force of a composite body was measured by the conventional procedures at several temperatures, as listed in the following table:

*Table I*

| Temp., ° C. | $_bH_c$ (oersteds) | $_fH_c$ (oersteds) |
|---|---|---|
| 23 | 54.8 | 43.0 |
| 35 | 54.8 | 47.2 |
| 50 | 54.8 | 43.0 |

It will be noted that the coercive forces of the body are listed under two columns which are identified as $_fH_c$ and $_bH_c$ and that the values for each temperature are substantially different. These symbols are used to identify the coercive forces found when the field was applied to the body in first one direction and then in the reverse direction. For example, and with reference to the schematic hysteresis loop shown in FIG. 3, when the field was increased from zero in the direction of $_fH$ and then reversed ($_bH$), the coercive force values $_bH_c$ were determined when the $_bH$ field was removed and the $_fH$ field reapplied, the coercive force values $_fH_c$ were determined. The several values for coercive force measured in both the $f$ and $b$ directions given above are the average values determined from several cyclical reversals at each temperature and are accurate within ±0.8 oersted.

It will be noted that the asymmetry of the hysteresis loop characteristic of this body as evidenced by the different values for the coercive forces, depending upon the direction of the applied field, is substantially independent of temperature at room temperature and temperatures substantially above room temperature.

While for the purposes of this disclosure a composite body comprising a glass substrate has been given as a working example, it would be appreciated that other nonferromagnetic materials may equally well be substituted therefor. For example, other nonmetallic bodies, such as ceramic or plastic bodies, or metallic bodies, such as copper, brass, aluminum or any other nonferromagnetic metal or alloy may be employed, the principal function of the body being to provide a substrate surface which acts to support the films deposited thereon.

Since the critical relationship which produces the unique magnetic properties in such composite bodies appears to depend upon the magnetic interaction or coupling between the antiferromagnetic portion and the ferromagnetic portion at the interface shared by the two portions, the lamellar configuration of this interface provides for a very large ratio of interface area to volume of antiferromagnetic and ferromagnetic materials. Since this magnetic coupling or interaction has been shown to exist between cobalt and cobalt oxide, iron and iron oxide, and nickel and nickel oxide, as disclosed in the U.S. Letters Patent 2,988,466, Meiklejohn, filed November 29, 1957, and assigned to the same assignee, it is apparent that this lamellar configuration may be used with advantage with other combinations of ferromagnetic and antiferromagnetic materials. In fact, this magnetic coupling or interaction has been found in a composite body substantially identical to that illustrated in FIG. 2 in which layer 11 was formed by evaporating a cobalt layer upon the glass substrate 10, oxidizing the cobalt to CoO and applying an overlying layer 12 of cobalt thereto in a manner substantially identical to that disclosed for the preparation of the particular body of FIG. 2. In particular, one such body was found to exibit a hysteresis loop shift of about 400 oersteds and a loop width ($_tH_c - _bH_c$) of about 200 oersteds when measured at 77° K.

These composite lamellar bodies were found to have a substantially constant or non-diminishing rotational hysteresis value at high applied magnetic fields and, as pointed out previously, because of their configuration are not limited to any particular lateral dimension or area.

It is obvious that methods of producing thin layers of ferromagnetic metals upon the surfaces of suitable substrates other than the evaporation techniques specifically disclosed may be employed. For example, sputtering or electrolytic deposition or any other known suitable means may be equally well used. However, in order to obtain the maximum magnetic properties in these bodies, the ratio of the area of the interface shared by the ferromagnetic portion and the antiferromagnetic portion to the volume of the ferromagnetic portion should be as great as possible. Furthermore, the thickness of the ferromagnetic portion should not exceed about 1000 Angstrom units for optimum magnetic properties. It will be appreciated that for many applications at least one of the lateral dimensions of the interface should be of the order of 100 times the thickness of the ferromagnetic layer or greater.

It will be obvious that multiple layer bodies may be formed, for example, by depositing a film of a ferromagnetic material upon a suitable substrate, oxidizing it to form an antiferromagnetic layer, depositing an overlying ferromagnetic film thereon, depositing another layer of ferromagnetic material thereover, oxidizing this layer of ferromagnetic material to form a second antiferromagnetic layer and repeating these processes to form a body of substantial thickness comprising alternating layers of anti-ferromagnetic and ferromagnetic materials which have a plurality of common magnetically-coupled interfaces. For example, the body shown in FIG. 3 has a suitable substrate 15 which has a plurality of layers of ferromagnetic metal 16 alternating with a plurality of layers 17 of anti-ferromagnetic material applied to the surface thereof. Alternatively, a plurailty of composite bodies as illustrated in FIG. 2 may be laminated or stacked one on top of the other. Additionally, while the glass body illustrated in FIG. 2 has a substantially planar surface upon which the antiferromagnetic and ferromagnetic portions are supported, it will be appreciated that it is not necessary that the substrate surface and therefore the interface shared by the antiferromagnetic and ferromagnetic portions of the composite body be planar, but the surface in the interface may equally well be formed on nonplanar or warped surfaces, bearing in mind, however, the previously stated ratio between area and volume.

Since other variations will readily occur to those skilled in the art, I do not intend my invention to be limited except as defined in the following claims.

What I claim as new and desire to secure by Letters Patent of the United States is:

1. A composite body having a single preferential direction of magnetic polarization and a substantially non-diminishing value of rotational hysteresis losses under high magnetic fields which comprises a non-ferromagnetic article having a film support surface portion, a film comprising a plurality of layers of an oxide selected from the group consisting of the oxides of iron, cobalt and nickel alternated with a plurality of layers of a ferromagnetic metal selected from the group consisting of iron, nickel and cobalt, adjoining oxide layers and metal layers being in direct contact with each other and constituting a magnetically-coupled interface between said layers and said ferromagnetic layer being not more than 1000 Angstrom units in thickness and at least one lateral dimension of said interface being at least 100 times the thickness of the ferromagnetic layer.

2. A composite body having a single preferential direction of magnetic polarization and a substantially non-diminishing value of rotational hysteresis losses under high magnetic fields which comprises a non-ferromagnetic article having a film-supporting surface portion, a substantially continuous layer of an antiferromagnetic oxide of a metal selected from the group consisting of iron, cobalt and nickel supported on said article surface portion, and a substantially continuous layer of a metal not more than about 1000 Angstrom units in thickness selected from the group consisting of iron, cobalt and nickel overlying the said oxide layer with said oxide layer and said metal layer in direct contact with each other and constituting a magnetically-coupled interface between said layers and with the metal being the same as the metal of the metal oxide.

3. A composite body having a single preferential direction of magnetic polarization and a substantially non-diminishing value of rotational hysteresis losses under high magnetic fields which comprises a non-ferromagnetic article having a film-supporting surface portion, a substantially continuous layer of an antiferromagnetic oxide of a metal selected from the group consisting of iron, cobalt and nickel supported on said article surface portion, and a substantially continuous layer of ferromagnetic material selected from the group consisting of iron, nickel and cobalt overlying the said oxide layer with the oxide and ferromagnetic material in direct contact with each other and constituting a magnetically-coupled interface between said layers, said ferromagnetic layer being not more than 1000 Angstrom units in thickness and at least one lateral dimension of the said interface being at least 100 times the thickness of the ferromagnetic layer.

4. A composite body having a single preferential direction of magnetic polarization and a substantially non-diminishing value of rotational hysteresis losses under high magnetic fields which comprises a non-ferromagnetic article having a film-supporting surface portion, a substantially continuous layer of an antiferromagnetic oxide of a metal selected from the group consisting of iron, cobalt and nickel supported on said article surface portion, and a substantially continuous layer of a metal not more than about 1000 Angstrom units in thickness selected from the group consisting of iron, cobalt and nickel overlying the said oxide layer with metal oxide and the said metal being in direct contact with each other and consistituting a magnetically-coupled interface between said layers.

5. A composite body having a single preferential direction of magnetic polarization and a substantially non-diminishing value of rotational hysteresis losses under high magnetic fields which comprises a non-ferromagnetic article having a film-supporting surface portion, a substantially continuous layer of antiferromagnetic nickel oxide supported on said article surface portion, and a substantially continuous layer of cobalt not more than about 1000 Angstrom units in thickness overlying the antiferromagnetic nickel ovide layer with nickel oxide and cobalt being in direct contact with each other and constituting a magnetically-coupled interface between said layers.

References Cited in the file of this patent

UNITED STATES PATENTS

| | | |
|---|---|---|
| 2,550,803 | Goddard | May 1, 1951 |
| 2,671,034 | Steinfeld | Mar. 2, 1954 |
| 2,819,186 | Franck | Jan. 7, 1958 |
| 2,865,787 | Risch | Dec. 23, 1958 |
| 2,914,428 | Ruckelshaus et al. | Nov. 24, 1959 |
| 2,988,466 | Meiklejohn | June 13, 1961 |